United States Patent

Normant et al.

[11] Patent Number: 6,087,981
[45] Date of Patent: Jul. 11, 2000

[54] METHOD FOR PULSE COMPRESSION WITH A STEPPED FREQUENCY WAVEFORM

[75] Inventors: Eric Normant, Montigny le Bretonneux; Rodolphe Cottron, Issy les Moulineaux, both of France

[73] Assignee: Thomson-CSF, Paris, France

[21] Appl. No.: 09/147,851

[22] PCT Filed: Jul. 21, 1998

[86] PCT No.: PCT/FR98/01607

§ 371 Date: Mar. 22, 1999

§ 102(e) Date: Mar. 22, 1999

[87] PCT Pub. No.: WO99/05543

PCT Pub. Date: Feb. 4, 1999

[30] Foreign Application Priority Data

Jul. 22, 1997 [FR] France .................................. 97 09285

[51] Int. Cl.[7] .......................... G01S 13/28; G01S 13/90; G01S 7/292; G01S 15/08
[52] U.S. Cl. ......................... 342/134; 342/192; 342/196; 342/202; 342/131; 342/132; 342/135; 342/25; 367/102; 367/118
[58] Field of Search ..................................... 342/118, 130, 342/131, 132, 134, 135, 192, 195, 196, 201, 202, 203, 204, 25; 367/88, 99, 102, 118, 128

[56] References Cited

U.S. PATENT DOCUMENTS

| | | | |
|---|---|---|---|
| 4,384,291 | 5/1983 | Lewis et al. | 342/196 |
| 5,251,186 | 10/1993 | Lockwood | 367/103 |
| 5,313,214 | 5/1994 | Graziano et al. | 342/200 |
| 5,359,575 | 10/1994 | Williams et al. | 367/127 |
| 5,389,933 | 2/1995 | Golinsky | 342/201 |
| 5,808,580 | 9/1998 | Andrews, Jr. | 342/108 |
| 5,910,785 | 6/1999 | Normant | 342/25 |

*Primary Examiner*—John B. Sotomayor
*Attorney, Agent, or Firm*—Oblon, Spivak, McClelland, Maier & Neustadt, P.C.

[57] ABSTRACT

The present invention relates to radars and sonars, and more particularly to a synthetic-band technique of pulse compression making it possible to reach a very high distance resolution. Synthetic band consists in transmitting a waveform pattern consisting of a string of N coherent elementary pulses, linearly frequency-modulated, following one another at a recurrence frequency $F_r$, of rectangular frequency spectra of elementary band B and of stepped carrier frequencies such that their frequency spectra will link up exactly one ahead of another to form a global spectrum of width N×B. On reception, the frequency spectra of the signals received in return for the N elementary pulses of a pattern are extracted by calculation, translated and juxtaposed so as to reconstruct a global frequency spectrum of width N×B and then compressed. Pulse compression is thus obtained which is equivalent to that which would result from the transmission of a waveform having a single pulse of frequency band N×B as pattern, whereas only elementary pulses of frequency band of width B were transmitted.

8 Claims, 5 Drawing Sheets

METHOD FOR PULSE COMPRESSION WITH A STEPPED FREQUENCY WAVEFORM

BACKGROUND OF THE INVENTION

The present invention relates to radars and sonars. It is known practice to improve the distance resolution of a radar or a sonar by the technique of pulse compression. Indeed, the distance resolving power $\Delta D$ of a radar or a sonar is related to the duration $\tau$ at reception of the pulse waveform transmitted by the relation:

$$\Delta D = \frac{c\tau}{2}$$

where c is the wave propagation speed. Since the duration $\tau$ and the width of the frequency spectrum or passband $\Delta F$ of the pulse waveform transmitted are related by a relation of the form:

$$\tau \Delta F = \beta$$

it is also possible to state that the distance resolving power of a radar or a sonar is inversely proportional to the passband of its pulse waveform.

The technique of pulse compression consists in lengthening the pulse waveform on transmission and then in compressing it on reception, thereby limiting the peak power to be transmitted. To put it into practice, use is generally made, at transmission, of a linearly frequency-modulated quasi-rectangular pulse and at reception, of a compression filter which delays the various frequency components of the pulse differently so as to make them coincide. The degree of compression and hence the distance resolving power is limited by the capacity available for producing large-band frequency-modulated pulses.

One way of countering this limitation consists in employing a particular waveform known by the designation: "synthetic band" (otherwise known as Stepped Frequency) and described in particular in the book by J. P. Hardange, P. Lacomme, J. C. Marchais, entitled: "Radars aeroportes et spatiaux" [Airborne and space radars], published by Masson 1995, pages 165–167.

Synthetic band consists in transmitting a waveform composed of a repetitive pattern of N successive pulses of duration T, of passband B, spaced apart by an interval $\Delta T$ in time and $\Delta F$ in frequency, the first being centred on $f_0$, the second on $f_0 + \Delta f$, the third on $f_0 + 2\Delta f$, etc.

After demodulation by its carrier frequency, each pulse received is filtered by a matched filter and then sampled and converted into digital. The processing continues with a discrete Fourier transform on N samples belonging to the same distance gate and acquired in succession for the N transmission frequencies of the N pulses of the waveform transmitted.

The response $|c(\Delta t)|$ of the receiver matched to the waveform, to the echo returned by a target after a time $t_0$, which results from the discrete Fourier transform, corresponds to that of the filter matched to each elementary pulse multiplied by a function similar to a sinc:

$$\frac{\sin(\pi N \Delta f (t_0 - \Delta t))}{\sin(\pi \Delta f (t_0 - \Delta t))}$$

It has a 3 dB width of:

$$\tau_{3dB} = \frac{1}{N \Delta f}$$

and contains a periodic term of period $1/\Delta f$.

The resolution is fixed by the width $1/N\Delta f$ of the reception spectrum of the pattern of the waveform transmitted whereas it would be only $1/B$ for a transmission waveform pattern limited to an elementary pulse.

To comply with the sampling theorem, the sampling period $\tau_e$ must be less than the inverse $1/B$ of the band of the elementary pulses of the waveform. Moreover, to avoid distance ambiguities, the analysis performed by the Fourier transform must cover at least the m distance gates over which the response of a target to a pulse at the output of the matched filter extends, this being conveyed with regard to the elementary gap $\Delta f$ between the carrier frequencies of the pulses, the sampling period $\tau_e$ and the passband B of each pulse by the condition:

$$\frac{1}{\Delta f} > m\tau_e \gg \frac{1}{B}$$

This condition imposes some overlap between the frequency spectra of the elementary pulses which implies that the distance resolution is improved by only a factor $N\Delta f/B$ which is less than N.

Another counterargument to the use of N successive pulses in the pattern of the waveform transmitted is that the coverage of a given swathe, with a certain resolution, takes N times as long as for a conventional pulse compression radar. If the constraint is to comply with a minimum recurrence frequency as in the case of a mapping radar, the dimension of the swathe is reduced in a ratio N.

SUMMARY OF THE INVENTION

The purpose of the present invention is to obtain a very high distance resolution from a transmitted waveform pattern consisting of a string of N elementary pulses of average resolution, of rectangular frequency spectra of band B and of carrier frequencies stepped in such a way that their frequency spectra will link up exactly to form an equivalent spectrum of width N×B.

It aims to recreate at reception a response to an equivalent pulse of frequency band N×B equal to that of the synthetic-band waveform pattern and, consequently, to improve the resolution by a factor N, doing so without the appearance of additional ambiguities as in the known synthetic-band process.

The advantages of transmitting a waveform pattern with a synthetic band relative to that of some other hypothetical waveform pattern having a frequency band N×B over a single elementary pulse are:
  a smaller signal sampling frequency at reception required to obtain a given resolution (decrease by a factor N);
  a greater capacity to resist the saturating of the receiver by intentional or unintentional electromagnetic jamming since the passband of the receiver is N times smaller;
  a greater resistance to the dispersivity of the antenna during electronic scanning of the beam.

On the other hand, it retains the drawback of the known synthetic-band process, namely of reducing the dimension of the swathe by a factor N.

The subject of the invention is a very high distance resolution pulse compression process for radar or sonar consisting:

in using on transmission a synthetic-band repetitive waveform pattern consisting of a string of N linearly frequency-modulated coherent elementary pulses following one another at a recurrence frequency $F_r$, of rectangular frequency spectra of elementary band B and of stepped carrier frequencies such that their frequency spectra will link up exactly one ahead of another to form a global frequency spectrum of width N×B, the said N elementary pulses following one another in any order corresponding via a permutation p(k) to the natural order based on increasing carrier frequencies;

in demodulating at reception the signal received in return for each elementary pulse by the carrier frequency of the relevant elementary pulse so as to extract the complex envelope therefrom;

in filtering the signals received and demodulated by a filter which passes the frequency band B of an elementary pulse;

in sampling the signals received, demodulated and filtered at a sampling frequency of the order of the band B of the elementary pulses, according to two time scales: one short-term scale, with variable τ measuring the time which elapses between two successive pulses of a pattern of the transmission waveform and catering for a tagging of targets along a distance axis, the other a longer-term scale with variable t, measuring the succession of patterns of the transmission waveform and catering for a tagging of targets along a Doppler or azimuth axis parallel to the direction of movement of the radar or of the sonar with respect to the targets;

in translating the frequency spectrum of the signal received in return for a Kth pulse so as to set it back in its place within the frequency spectrum of the global pattern of the transmitted waveform by multiplying the samples of the return signal for a kth elementary pulse by a complex exponential dependent on the time variable τ along the distance axis:

$$t_r^k(\tau) = \exp\{i 2\pi \Delta f_{p(k)}(\tau + \tau_0)\}$$

$\tau_0$ being the lag after which storage of the digital samples on the distance axis begins, $\Delta f_p(k)$ being the carrier frequency gap of the kth elementary pulse with respect to the central carrier frequency $f_c$ of the pattern;

in performing a distancewise spectral analysis of an oversampling, in a ratio N, of the frequency-translated complex samples so as to go, distancewise, from the time domain with variable Δ to a frequency domain with variable F and obtain a sampled frequency spectrum for the return signal of each elementary pulse;

in selecting from the distancewise frequency spectrum obtained for the signal received in return for a kth elementary pulse, the samples belonging to a span centred around $\Delta f_p(k)$ with a width equal to that of the band B of an elementary pulse;

in constructing, from the samples of the selected spans of the distancewise frequency spectra of the signals in return for the elementary pulses, a sampling of the product of the global distancewise frequency spectrum of the signal received in return for the set of elementary pulses of a synthetic-band waveform pattern, times the conjugate of the global frequency spectrum of the elementary pulses of a synthetic-band waveform pattern so as to carry out filtering matched globally to the synthetic-band waveform, and in performing a distancewise inverse spectral analysis so as to return to the distancewise time domain and obtain a distance-compressed received signal.

The distancewise spectral analysis of an oversampling, in a ratio N, of the frequency-translated samples of the signal received in return for an elementary pulse of order k may be carried out:

by oversampling, in a ratio N, the frequency-translated complex samples, by inserting N−1 null samples between each of them, and by performing a distancewise discrete Fourier transform on the oversamples obtained so as to go, distancewise, from the time domain with variable τ to a frequency domain with variable F.

The distancewise spectral analysis of an oversampling, in a ratio N, of the frequency-translated samples of the signal received in return for an elementary pulse of order k can also be carried out:

by performing a distancewise discrete Fourier transform on the frequency-translated complex samples so as to go distancewise from the time domain with variable τ to a frequency domain with variable F, and by duplicating N times the sampled frequency spectrum obtained.

This latter way of carrying out the distancewise spectral analysis of an oversampling, in a ratio N, of the frequency-translated complex samples of the signal received in response to the transmission of an elementary pulse has a definite advantage over the previous one since it makes it possible to replace the calculation of N Fourier transforms of large size with that of N Fourier transforms of smaller size, the size ratio being of the order of N.

The construction of the sampling of the product of the global frequency spectrum of the signal received times the conjugate of the global frequency spectrum of a synthetic-band waveform pattern can be carried out:

by multiplying the samples of the selected span of the distancewise frequency spectrum of the signal received in return for a kth elementary pulse by the conjugate $X_{1,k}^*(F)$ of the frequency spectrum of this kth transmitted elementary pulse, so as to carry out a matched filtering, $X_{1,k}(f)$ complying with the relation:

$$X_{1,k}(F) = P(F - \Delta f_{p(k)}) e^{-i 2\pi (F - \Delta f_{p(k)}) T/2}$$

or, more accurately, with the relation:

$$X_{1,k}(F) = P(F - \Delta f_{p(k)}) e^{-i 2\pi (F - \Delta f_{p(k)}) T/2} e^{i 2\pi f_{dc} \Delta t_k}$$

P(F) being the spectrum of an elementary pulse transmitted at the central carrier frequency of the synthetic-band waveform pattern and $f_{dc}$ a mean Doppler parameter conveying the influence of the time variable t on the radar/target outward/return propagation time, and by juxtaposing the spans of the frequency spectra obtained, after matched filterings, for the signals received in return for the elementary pulses, so as to produce a global frequency spectrum which would correspond, after matched filterings, to that of a signal obtained in response to a linearly frequency-modulated single pulse of band N×B.

The construction of the sampling of the product of the global frequency spectrum of the signal received times the conjugate of the global frequency spectrum of a synthetic-band waveform pattern can likewise be carried out:

by juxtaposing the samples of the selected spans of the frequency spectra of the signals received in return for the elementary pulses, and by multiplying the samples of the global frequency spectrum obtained by the conjugate $X_1^*(F)$ of the global frequency spectrum resulting from the juxtaposition of the frequency spectra of the elementary pulses transmitted, $X_1(F)$ complying with the relation:

$$X_1(F) = \sum_k P(F - \Delta f_{p(k)}) e^{-i2\pi(F-\Delta f_{p(k)})T/2} \text{rect}\left[\frac{F - \Delta f_{p(k)}}{B}\right]$$

or, more accurately, with the relation:

$$X_1(F) = \sum_k \text{rect}\left[\frac{F - \Delta f_{p(k)}}{B}\right] P(F - \Delta f_{p(k)}) e^{-i2\pi(F-\Delta f_{p(k)})T/2} e^{i2\pi \tilde{f}_{dc}\Delta t_k}$$

$P(F)$ being the spectrum of an elementary pulse transmitted at the central carrier frequency of the synthetic-band waveform pattern and $f_{dc}$ a mean Doppler parameter conveying the influence of the time variable t on the radar/target outward/return propagation time.

Advantageously, when the reception signal is intended to undergo Doppler processings, whether these be spectral analyses peculiar to Doppler-pulse radars or mapping radar SAR processing, the above process for very high distance resolution pulse compression is supplemented with a complementary processing for initializing the Doppler processings. This complementary processing is effected on the received-signal samples arrayed as a two-dimensional table $v_2(\tau, t)$, as a function of the two time variables: $\tau$ along the distance axis and t along the Doppler axis. It consists, after having performed in succession a distancewise Fourier transform and then an azimuthal Fourier transform on the signal so as to go into the distancewise frequency domain with the frequency variable F and azimuthal frequency domain with the frequency variable f and obtain a table of samples $V_2(F,f)$, in multiplying the sequences of samples belonging to the various distance spectral regions of the elementary pulses splitting into N sub-bands of width B, the band N×B of the frequency variable F, by a phase corrective term such that:

$$\exp\{i2\pi(f-f_{dc})\Delta t_k\}$$

where $\Delta t_k$ is the lag separating the kth relevant pulse from the middle of the pattern of the transmission waveform of which it forms part and $f_{dc}$ a mean Doppler parameter conveying the influence of the time variable t on the radar/target outward/return propagation time.

This corrective term $b_r^k(f)$ compensates for a phase shift term dependent on the rank of the elementary pulses, introduced by chopping the pattern of the transmission signal into several elementary pulses of stepped carriers.

The use of a repetitive waveform pattern consisting of a string of N coherent elementary pulses of stepped carrier frequencies which do not follow one another in a natural order of increasing or decreasing carrier frequencies but according to a certain permutation with respect to such a natural order, makes it possible to reduce the distance ambiguity in so far as this makes it possible to adopt a gap between the carrier frequencies of two successive pulses in a pattern which is larger than the unit step and which increases the rejection power of the band filter of the receiver in regard to the ambiguous responses which do not correspond to the last pulse transmitted but to a previous pulse.

BRIEF DESCRIPTION OF THE DRAWINGS

Other characteristics and advantages of the invention will emerge from the description below of an embodiment given by way of example. This description will be given in conjunction with the drawing, in which.

a FIG. 1 represents a timing diagram for the synthetic-band transmission waveform pattern used in the very high distance resolution pulse compression process according to the invention.

a FIG. 2 represents a schematic diagram of a radar implementing the transmission waveform pattern illustrated in FIG. 1.

a FIG. 3 represents a schematic diagram of a distance pulse compression processing according to the invention.

Figure 1:
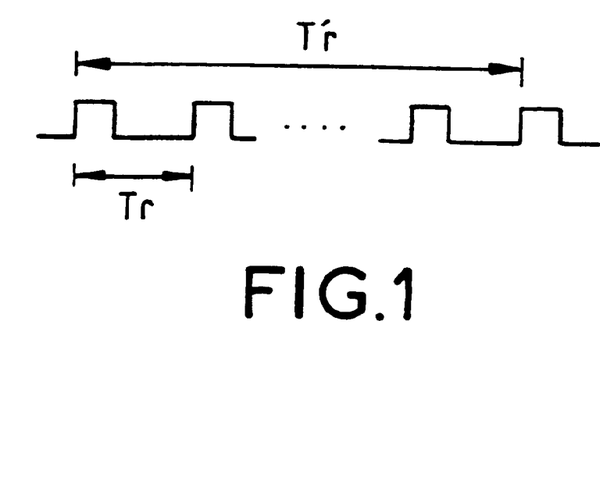

As shown in FIG. 1, the transmission waveform which it is proposed to use consists of the repetition, at a recurrence frequency $F'_r+1/T'_r$, of a pattern consisting of N elementary pulses of like duration T repeated at a recurrence frequency $F_r=1/T_r$. Without loss of generality, it will be assumed in what follows that:

$$F_r=NF_r'$$

Under the assumption that the elementary pulses are linearly frequency-modulated according to the same slope $\alpha$, the expression for their complex envelope is given by the relation:

$$p(\tau) = \text{rect}\left[\frac{\tau}{T}\right]\exp\left\{i2\pi\frac{1}{2}\alpha\tau^2\right\}$$

The frequency band B occupied by an elementary pulse is equal to:

$$B=|\alpha|T$$

Assuming that the product B×T is sufficiently large (>200), and applying the stationary phase principle, the frequency spectrum of this elementary waveform is given by:

$$P(F) \approx \sqrt{\frac{T}{B}}\text{rect}\left[\frac{F}{B}\right]\exp\left\{i\frac{\pi}{4}\text{sgn}(\alpha)\right\}\exp\left\{-i2\pi\frac{F^2}{2\alpha}\right\}$$

This frequency spectrum has a quasi-rectangular envelope.

In what follows we shall restrict ourselves to elementary pulses of this type although this is not in the least necessary in theory, since it is by far the most widespread in operational radar imaging systems. Furthermore, the fact that the frequency spectrum of pulses of this type is quasi-rectangular makes it a candidate particularly suited to the compression process to be described.

Each elementary pulse in the waveform pattern will be distinguished by its rank k referenced with respect to the middle of the pattern. For an odd number of elementary pulses N, the rank k lies between:

$$-\frac{N-1}{2} \leq k \leq \frac{N-1}{2}$$

For an even number of elementary pulses N, the rank k lies between:

$$-\frac{N}{2}+1 \leq k \leq \frac{N}{2}$$

The information useful for obtaining the resolution on the distance axis is here distributed over a series of N pulses rather than being contained in a single pulse as is the case for conventional radar imaging systems employing a repetitive transmission waveform pattern consisting of a series of identical pulses. Each pulse of the series has a relative lead or delay with respect to another. In the following description, we have chosen to calculate this lead or this delay with respect to a reference situated in the middle of the pattern. This makes it possible in radar imaging applications using synthetic aperture radar SAR to provide a symmetric Doppler phase history.

Under these conditions, the time swift of each pulse as a function of its rank is given by:

$$\begin{cases} \Delta t_k = kT'_r & \text{for } N \text{ odd} \\ \Delta t_k = kT'_r - T'_r/2 & \text{for } N \text{ even} \end{cases}$$

Let B be the useful band associated with each elementary pulse, then the N carrier frequencies used to modulate the elementary pulses are contrived in such a way as to be spaced B apart. This makes it possible to reconstruct, over the synthetic band, an equivalent global spectrum with no void. Thus, each elementary pulse is modulated on a carrier frequency, $f_k$, which depends on the rank of the pulse in the pattern. If in a pattern the pulses are ranked in order of increasing carrier frequency, the expression for the carrier frequency $f_k$ of the pulse of rank k is given by:
where $f_c$, denotes the central carrier frequency of the pattern.

However, to reduce the level of distance ambiguity, it is beneficial to transmit the pulses making up a pattern in an order which differs from the natural order of increasing or decreasing carrier frequencies. This is because, so as to ease the filtering carried out by the bandpass reception filter, it is beneficial to arrange matters in such a way that the pulses follow one another in a pattern with carrier frequency gaps of greater than the unit step. A pulse of rank k in the pattern then has a carrier frequency $f_{p(k)}$ which is not the frequency $f_k$ but another frequency, $f_{k'}$, the index k' corresponding to the index k via a permutation p. Stated otherwise, the spectral region occupied by a pulse of rank k is given by:

$$f_k = \begin{cases} f_c + kB, & N \text{ odd} \\ f_c - \frac{B}{2} + kB, & N \text{ even} \end{cases} = f_c + \Delta f_k$$

Figure 2:
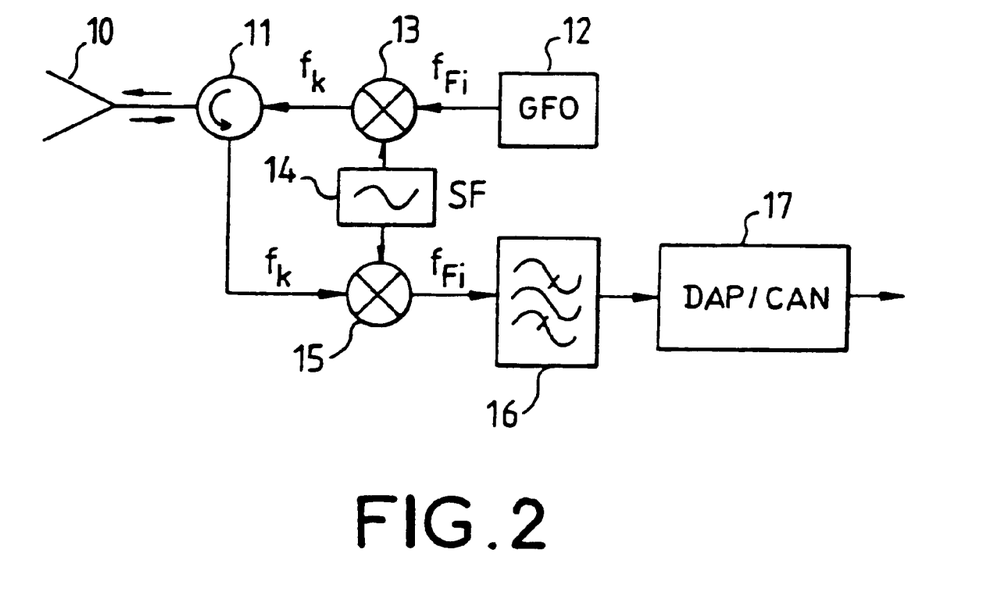

FIG. 2 gives an example of a schematic diagram of a radar implementing this waveform. Depicted therein is an antenna 10 linked by a circulator 11 to a transmission part and to a reception part.

The transmission part comprises a waveform generator GFO 12 which produces, at an intermediate carrier frequency $f_{Fi}$, an elementary pulse with linear frequency modulation. This waveform generator GFO 12 is linked to the antenna 10 by way of the circulator 11 and of a mixer 13 which receives from a source of frequencies SF 14, various carrier frequencies which make it possible to arrange matters such that the N elementary pulses of the waveform applied to the antenna 10 each modulate the frequencies $f_1, \ldots, f_k, \ldots, f_N$.

The reception part comprises, at the output of the circulator 11, a mixer 15 which mixes the signal received by the antenna 10 with the carrier frequencies emanating from the source of frequencies SF 14 so as to refer the return echoes from the elementary pulses of the transmitted waveform to an intermediate frequency $f_{Fi}$. This mixer 15 is followed by a bandpass filter 16 matched to the frequency band of an elementary pulse and by an amplitude/phase demodulator associated with an analog/digital converter DAP/CAN 17 which provides a sampling of the complex envelope of the signal received and demodulated.

To allow pulse compression at reception of the transmitted waveform pattern, it is necessary to ensure coherence between the various elementary pulses of which it consists. This requires the source of frequencies SF 14 to be coherent for each of the N carrier frequencies generated. Moreover, for certain applications, it can happen that the useful return corresponding to a pulse of rank k occurs in the reception window for a pulse of different rank. This then necessitates either N different coherent sources of frequency associated with each of the carrier frequencies, or a single source of frequencies which is capable of keeping the phase reference associated with. a given carrier after having transmitted on several other frequencies in the meantime.

It is noted that by virtue of the filtering matched to the elementary pulse, the number of distance ambiguities does not increase for the relevant waveform as compared with a waveform consisting of the same elementary pulse repeated at the recurrence frequency $F_r$. This is due to the fact that the returns corresponding to different ranks of the elementary pulse in respect of which the frequency source is adjusted at the time are rejected by the bandpass reception filter.

In all generality, the echo signal $v_{o,k}(\tau, t)$ in response to the transmitted pulses of kth rank can be regarded as the result of a correlation in two dimensions $\tau$ and t between the complex backscattering coefficient $\gamma_k(\tau, t)$ of the targets with coordinates $\tau$ and t for the carrier frequency of the pulses of rank k, and the product of the waveform p() of an elementary pulse of rank k transmitted times an impulse response $h_{az,k}()$. The waveform p() of the relevant elementary pulse of rank k is delayed by the time required for the outward/return propagation thereof up to the desired point with coordinates $\tau$ and t, the delay varying not only as a function of the distance coordinate $\tau$ but also as a function of the azimuth coordinate t so as to take account of the migration phenomenon occasioned by a possible movement of the radar with respect to the targets. The azimuthal impulse response $h_{az,k}()$ conveys a synthetic antenna or SAR effect resulting from the azimuthal aperture width of the antenna of the radar and of the possible movement of the radar with respect to the targets.

By adopting for the waveform of an elementary pulse and the impulse response of the synthetic antenna effect a common time origin, along the azimuth coordinate t, independent of the order of a pulse in a synthetic-band waveform pattern, it follows that:

$$v_{0,k}(\tau, t) = \int\int \gamma_k(\tau', t')p\left(\tau - \frac{T}{2} + \tau_0 - \tau_c(t - t' - T_e/2 + \Delta t_k) - \tau'\right) \quad (1)$$

$$h_{az,k}(t - t' - T_e/2 + \Delta t_k)d\tau'dt'$$

T being the duration of an elementary pulse, $\tau_0$ being the lag after transmission of an elementary pulse, whereafter consideration of the receipt signal begins, $T_e$ the time of illumination of a target, $\tau_c$ being the variation in the radar/target outward/return propagation time during the time of illumination $T_e$, $\Delta t_k$ the time shift of the pulse of rank k.

The azimuthal impulse response $h_{az,k}$ due to the synthetic antenna effect, that is to say to the combined effect of an antenna having a certain azimuthal aperture and of the azimuthal movement of the radar with respect to the targets, is expressed, in a well-known manner, by the relation:

$$h_{az,k}(t) = \text{rect}\left[\frac{t}{T_e}\right]g_{az}(t)\exp[-i2\pi f_{p(k)}\tau_c(t)] \quad (2)$$

where $g_{az}$ is the azimuthal transmission/reception antenna diagram of the radar and $f_{p(k)}$ the carrier frequency of the elementary pulse of rank k:

$$f_{p(k)}=f_c+\Delta f_{p(k)} \quad (3)$$

$f_c$ being the central carrier frequency of a pattern and $\Delta f_{p(k)}$ the gap of the carrier frequency of the kth pulse with respect to the central carrier frequency of the pattern $f_c$, given that the elementary pulses are not in natural order but permuted so as to improve the effectiveness of the bandpass reception filter.

According to the expression for the echo signal $v_{o,k}(\tau, t)$ in response to the transmitted pulses of rank k, it is apparent that there is great synergy with the case of the conventional waveform consisting of a string of elementary pulses of like carrier frequency. It is therefore conceivable to seek to extract from the reception signal following the transmission of a synthetic-band waveform with N elementary pulses of different carrier frequencies, N conventional raw reception video signals with parameters matched to each elementary pulse ($\Delta t_k$, Doppler parameters) and then to fuse these N independent raw video signals by interposing the recurrences as a function of their rank so as to try to approximate the echo signal received by a conventional waveform consisting of one and the same pulse of band N×B.

The guideline for the pulse compression processing in respect of a synthetic-band waveform will then consist in synthesizing, from the N raw reception video signals extracted from the signals received in response to the N elementary pulses of the synthetic-band waveform, a global spectrum of width N times greater than the spectrum of an elementary pulse and then in compressing the signal corresponding to this global spectrum.

The synthesis of a global spectrum of width N times greater than the spectrum of an elementary pulse begins by setting each spectrum of the N signals received in response to the N elementary pulses in its place within the global spectrum of a synthetic-band waveform. This placement is achieved by translating the spectrum of the signal received in response to an elementary pulse of rank k by a value $\Delta f_{p(k)}$, by multiplying the raw video signal received in response to an elementary pulse of rank k by:

$$tr_k(\tau)=\exp[i2\pi\Delta f_{p(k)}(\tau+\tau_0)]$$

After multiplication by the translation signal, a Fourier transform is performed along the distance coordinate $\tau$ so as to extract the frequency spectrum of the signal received in echo to a transmitted pulse of rank k. This spectrum $V_{1,k}(f, t)$ is expressed as a function of the signal value $V_{0,k}(\tau, t)$ taken in relation (1) by:

$$v_{1,k}(F, t) = \int\int \gamma_k(\tau', t')h_{az,k}(t - t' - T_e/2 + \Delta t_k)$$

$$\int p(\tau - \tau' - T/2 + \tau_0 - \tau_c(t - t' - T_e/2 + \Delta t_k))$$

$$\exp[i2\pi\Delta f_{p(k)}(\tau + \tau_0)]\exp[-i2\pi F\tau]d\tau dt'd\tau'$$

$$= P(F - \Delta f_{p(k)})\exp[-i2\pi(F - \Delta f_{p(k)})T/2]$$

$$\int\int \gamma_k(\tau', t')\exp[i2\pi F\tau_0]h_{az,k}(t - t' - T_e/2 + \Delta t_k)$$

$$\exp[-i2\pi(F - \Delta f_{p(k)})(\tau' + \tau_c(t - t' - T_e/2 + \Delta t_k))]d\tau'dt'$$

Replacing the azimuthal impulse response to an elementary pulse of rank k, $h_{az,k}()$ by its value taken in relation (2) and the term $\Delta f_{p(k)}$ by its value taken in relation (3), and performing the necessary simplifications, we obtain:

$$V_{1,k}(F, t) = P(F - \Delta f_{p(k)})\exp[-i2\pi(F - \Delta f_{p(k)})T/2] \quad (4)$$

$$\int\int \gamma_k(\tau', t')\exp[i2\pi F\tau_0]h_{az}(t - t' - T_e/2 + \Delta t_k)$$

$$\exp[-i2\pi F\tau_c(t - t' - T_e/2 + \Delta t_k)]$$

$$\exp[-i2\pi(F - \Delta f_{p(k)})\tau']d\tau'dt'$$

with:

$$h_{az}(t) = \text{rect}\left[\frac{t}{T_e}\right]g_{az}(t)\exp[-i2\pi f_c\tau_c(t)]$$

It is then appreciated that, by virtue of the spectrum translation operation, it is possible to express the spectrum of the raw video signal received in response to a pulse of rank k on the basis of an azimuthal impulse response which no longer depends on the carrier frequency associated with the rank of the elementary pulse but only on the central frequency fc of the pattern of the synthetic-band waveform. The phase shift of the Doppler history is now determined by the central carrier frequency of the pattern of the synthetic-band waveform. However, the presence of a delay specific to a waveform of rank k is observed, a topic to which we shall return subsequently.

Another important point to be noted is the influence of the knowledge of the instant To onwards of which storage of the digital samples on the distance axis begins. This is because, contrary to the conventional waveform, this term introduces by reason of the change of carrier frequency a phase shift which depends on the rank of the relevant elementary pulse. It is compensated for here in the spectrum translation signal in which the absolute time ($\tau+\tau_0$) has been considered. If this phase term with the expression:

$$\exp[i2\pi\tau\Delta f_{p(k)}\tau_0]$$

were not compensated for, there would be parasitic phase-shifts for each sub-band over the entire synthetic band, and this would considerably degrade the distancewise impulse response of a radar imaging system.

In practice, the signal received takes the form of digital samples with a sampling frequency $F_e$ matched to the passband of an elementary pulse:

$$F_e=1/B$$

This sampling frequency is insufficient to reconstruct the frequency spectrum of width N×B of a single pulse equivalent to the N elementary pulses of the synthetic-band waveform. Several solutions can be envisaged for arriving at the spectrum of a raw video signal received in return for a pulse of order k, which is oversampled and frequency-translated.

A first solution consists in:
- oversampling, by a factor N, the raw video signal received in response to each elementary pulse, by inserting (N−1) null samples between each starting sample, so as to make the new sampling frequency compatible with the N times greater width of the synthetic band,
- multiplying the oversampled raw video signal obtained by the complex exponential spectrum translation signal:

$$tr_k(\tau) = \exp[i2\pi \Delta f_{p(k)}(\tau+\tau_0)]$$

- calculating by DFT the distancewise Fourier transform of the result along the distance coordinate $\tau$ and
- retaining only the useful samples of the frequency spectrum, that is to say of those belonging to the useful spectral region of the elementary pulse processed.

To understand the influence of the oversampling operation on the result of the discrete Fourier transform, we compare the results obtained when oversampling is or is not carried out. Let:
- in the absence of oversampling, $(X_k)_{0 \leq k < M}$ be the samples of the raw video reception signal and $(X_k)_{0 \leq k < M}$ those of the discrete Fourier transform resulting therefrom and
- in the presence of an oversampling of ratio N, $(y_m)_{0 \leq m < NM}$ be the oversamples of the raw video reception signal and $(y_m)_{0 \leq m < NM}$ those of the discrete Fourier transform resulting therefrom.

By definition we have:

$$X_m = \sum_{j=0}^{M-1} x_j e^{-i2\pi \frac{jm}{M}} \text{ and } Y_m = \sum_{j=0}^{MN-1} y_j e^{-i2\pi \frac{jm}{MN}}$$

By making, in the expression for Y, the change of variable j=kN+l, it follows that:

$$Y_m = \sum_{k=0}^{M-1} \sum_{l=0}^{N-1} y_{kN+l} e^{-i2\pi \frac{(kN+l)m}{MN}}$$

or again, taking the null oversamples into account:

$$Y_m = \sum_{k=0}^{M-1} y_{kN} e^{-i2\pi \frac{kNm}{MN}} = \sum_{k=0}^{M-1} x_k e^{-i2\pi k \frac{m}{M}} = X_{m \bmod M}$$

It is then observed that the spectrum of the oversampled signal is periodic and formed of a succession of N repetitions of the spectrum of the starting signal.

This observation leads to an alternative solution, which is less expensive computationally, for obtaining the spectrum of the oversampled signal. To obtain the spectrum of the oversampled signal it is in fact possible to exploit its periodicity so as to calculate only one of its periods which corresponds to the discrete Fourier transform of the starting signal, and then to complete. it by repeating the calculated period.

This alternative solution is compatible with the initial desire to translate the spectrum of the starting signal by a frequency $\Delta f_{p(k)}$ which may be greater than the sampling frequency $F_e$.

Thus, if we apply the translation signal whose samples are defined by:

$$tr_k(n) = \exp\left[i2\pi \Delta f_{p(k)}\left(\frac{n}{F_e} + \tau_0\right)\right]$$

the starting signal is merely translated by $\Delta f_{p(k)}$ mod $F_e$. However, given that the spectrum of the oversampled signal has been reconstructed by juxtaposing N periods, it follows that:

$$Y(F) = \sum_j X(F - jF_e - \Delta f_{p(k)} \bmod F_e)$$

Since, moreover, the frequency jump $\Delta f_{p(k)}$ is compatible with the new sampling frequency $Nf_e$, there exists an index j such that:

$$\Delta f_{p(k)} = jF_e + \Delta f_{p(k)} \bmod F_e$$

Thus, by duplicating the spectrum of the starting signal, we do indeed obtain the spectrum of the signal oversampled at $NF_e$ and translated by $\Delta f_{p(k)}$.

This alternative solution for obtaining the spectrum of the raw video signal received in response to an elementary pulse of order K, oversampled in a ratio N and frequency-translated by the gap $\Delta f_{p(k)}$ exhibited by the carrier of this pulse of rank k with respect to the central frequency of the pattern fc, which consists, after having frequency-translated the raw video reception signal, in calculating.the discrete Fourier transform thereof so as to obtain the base period of the spectrum and in juxtaposing N of these periods to obtain the complete spectrum, is very beneficial from the point of view of the amount of computation demanded. This is because, it makes it possible, to first order, to replace the calculation of N FFTs of large size by N FFTs of smaller size, the size ratio being of the order of N.

Once the elementary spectra of the raw video signals received in response to the elementary pulses of the pattern of the synthetic-band waveform have been obtained and realigned, the global spectrum of the reception signal in response to the pattern of the synthetic-band waveform is reconstructed by juxtaposing the various elementary spectra. From the mathematical point of view, this amounts to constructing a signal $V_1(F, t)$ of the form:

$$V_1(F, t) = \sum_k V_{1,k}(F, t) \text{rect}\left[\frac{F - \Delta f_{p(k)}}{B}\right]$$

where the presence of the rectangle function connotes that, in each elementary spectrum, the useful frequency bins are selected, the others being rejected.

Once the global spectrum of the reception signal in response to the synthetic-band waveform pattern is obtained, it is possible to proceed with the pulse compression proper. The latter is achieved by multiplying the samples of the global spectrum by those of the spectrum of the matched filter. The case of the conventional waveform provides the inspiration for building the samples of the spectrum of the matched filter whilst complying with the specific features of the synthetic band.

If no calibration signals are available, it is ossible, in order to build the samples of the spectrum of the matched filter, to start from the samples of the theoretical elementary pulse p(τ) and then to subject this starting signal to exactly the same processing as that just described for the signal received. That is to say, this signal is duplicated N times so as to construct a complete pattern. For each of the elementary pulses, the spectrum translation and oversampling are performed in accordance with the index thereof in the pattern. The following signals are thus obtained:

$$X_{1,k}(F) = P(F - \Delta f_{p(k)}) e^{-i2\pi(F - \Delta f_{p(k)})T/2}$$

Construction of the synthetic band for these reference signals leads to:

$$X_1(F) = \sum_k P(F - \Delta f_{p(k)}) e^{-i2\pi(F - \Delta f_{p(k)})T/2} \text{rect}\left[\frac{F - \Delta f_{p(k)}}{B}\right]$$

The expression for the transfer function Hi of the matched filter is then given by:

$$H_i(F) = X_1^*(F)$$

To control the level of the side lobes of the impulse response of the matched filter, a weighting window which is effective in the case of the conventional waveform is introduced into the above expression. This effective weighting can be written in the form:

$$W_{\it eff} = G_{proc} \text{rect}\left[\frac{F}{NB}\right] \frac{W(F)}{|X_1(F)|^2}$$

where W(F) is the useful weighting window and $G_{proc}$ is a constant factor compensating for the gain afforded by the processing which is optional.

Thus, the complete expression for the transfer function of the matched filter is given, in the general case, by:

$$H_i(F) = G_{proc} \text{rect}\left[\frac{F}{NB}\right] \frac{W(F)}{|X_1(F)|^2} X_1^*(F)$$

In order to take certain defects in the radar transmission/reception chain into account, it is preferred to transmit without exterior radiation of energy by the antenna, receive and record a number of synthetic-band waveform patterns. After averaging, a reference pattern with N elementary pulses is available characterizing the behaviour of the radar transmission/reception chain. The transfer function of the matched filter is then built from the digital samples of these elementary reference pulses in the same way as for the theoretical pattern. It should however be remembered that the $\tau_0$ individual to these pulses must be taken into account in generating the frequency translation signals. This is because the $\tau_0$ of the calibration signals is in general different from that of the signals received during normal operation.

From the mathematical point of view, the signal $V_2(F, t)$ obtained after matched filtering in the distancewise frequency domain and azimuthal time domain has the following expression:

$$V_2(F, t) =$$

$$\text{rect}\left[\frac{F}{NB}\right] W(F) G_{proc} \int \sum_k \exp[i2\pi F\tau_0] \exp[-i2\pi F\tau_c(t - t' - T_e/2 + \Delta t_k)]$$

$$\text{rect}\left[\frac{F - \Delta f_{p(k)}}{B}\right] h_{az}(t - t' - T_e/2 + \Delta t_k) \Gamma_k(F, t') dt'$$

-continued with:

$$\gamma_k(\tau, t) \xrightarrow{FFT_\tau} \Gamma_k(F, t)$$

Putting:

$$\Gamma_k(F, t) = \Gamma(F + \Delta f_{p(k)}, t)$$

it follows that:

$$V_2(F, t) =$$

$$\text{rect}\left[\frac{F}{NB}\right] W(F) G_{proc} \int \Gamma(F, t') \exp[i2\pi F\tau_0] \sum_k \text{rect}\left[\frac{F - \Delta f_{p(k)}}{B}\right] \exp$$

$$[-i2\pi F\tau_c(t - t' - T_e/2 + \Delta t_k)] h_{az}(t - t' - T_e/2 + \Delta t_k) dt'$$

To return to the distancewise time domain, a distancewise inverse Fourier transform is performed on the signal obtained. Having finished this stage, access is available to the radar/target distance information required to perform the operations for correcting the parasitic motion of the carrier of the radar or for taking into account the non-stationarities in the impulse response of the radar system.

The signal $V_2(\tau, t)$ obtained after the distancewise inverse Fourier transform is expressed by:

$$v_2(\tau, t) = G_{proc} NB\text{wsinc}(NB\tau) *_\tau \int \int \Gamma(F, t') \exp[i2\pi F\tau_0]$$

$$\sum_k \text{rect}\left[\frac{F - \Delta f_{p(k)}}{B}\right] \exp[-i2\pi F\tau_c(t - t' - T_e/2 + \Delta t_k)]$$

$$h_{az}(t - t' - T_e/2 + \Delta t_k) e^{i2\pi F\tau} dt' dF$$

the operator $*_\tau$ denoting a convolution in the distance coordinate $\tau$.

The latter expression shows that, in a manner similar to the conventional waveform, the signal obtained is the result of convolving the impulse response after distancewise processing and the sought-after signal, itself convolved with the azimuthal impulse response.

To compensate for the constant gain afforded by the processing, the gain compensation factor $G_{proc}$ must be given the following value:

$$G_{proc} = \frac{1}{NB\text{wsinc}(0)}$$

In practice, the distancewise inverse Fourier transform is implemented in the form of a DFT.

By examining more carefully the expression for the signal obtained $V_2(\tau, t)$, it is observed that the novelty of the synthetic-band waveform is to introduce a dependency on the azimuthal impulse response with regard to the relevant distance spectral region, doing so through the delays $\Delta t_k$.

Returning to the expression of relation (4) detailing the azimuthal impulse response, it may be seen that the azimuthal impulse response introduces a parasitic phase shift which varies as a function of the $\Delta t_k$ of the form:

$$\text{dop}_k(t - t' - T_e/2 + \Delta t_k) = \exp[-i2\pi f_c \tau_c(t - t' - T_e/2 + \Delta t_k)]$$

which conveys the Doppler phase history as a function of azimuthal time t affecting a target having an azimuth coordinate t'.

The radar/target outward/return propagation time $\tau_c$ is dependent on the radial distance of the relevant target. It is a parabolic function of the azimuthal time coordinate t which is customarily modelled by means of the Doppler parameters. Restricting ourselves for the sake of simplicity to a finite expansion of order 2 it is expressed by the relation:

$$\tau_c(t) = \tau_{c0} + \tau'_c(t)$$

$$= \tau_{c0} - \frac{1}{f_c}\left\{f_{dc}t + \frac{1}{2}f_{dc}t^2\right\}$$

$\tau_{c0}$ denoting the distancewise time coordinate $\tau$ of the relevant target, $f_c$ the central carrier frequency of the pattern, $f_{dc}$ the mean Doppler and $f_{dr}$ the Doppler slope.

Under these conditions, the variable parasitic phase shift $dop_{k()}$ due to the azimuthal impulse response can be written:

$$dop_k(t) =$$

$$\exp[-i2\pi f_c \tau_{c0}]\exp\left[i2\pi\left(f_{dc}(t - T_e/2) + f_{dc}\Delta t_k + \frac{1}{2}(f_{dr}(t - T_e/2))^2 + \frac{1}{2}f_{dr}\Delta t_k^2 + f_{dr}\Delta t_k(t - T_e/2)\right)\right]$$

which shows that the azimuthal impulse response introduces, in addition to a distance-dependent variable phase shift tagged by the value of the term tco, a parasitic phase shift dependent on the relevant spectral sub-band, of value:

$$\exp\left[i2\pi\left\{+f_{dc}\Delta t_k + \frac{1}{2}f_{dr}\Delta t_k^2 + f_{dr}\Delta t_k(t - T_e/2)\right\}\right]$$

The presence of parasitic phases for each spectral sub-band introduces considerable degradations into the quality of the impulse response. To be convinced of this, it is sufficient to consider the simple example of a synthetic-band waveform pattern where N=2 and where there is a phase shift $\pi$ between the spectral sub-bands. In this case, instead of getting a weighted sinc azimuthal impulse response akin to a sum channel diagram of an array antenna, an azimuthal impulse response with two symmetric main lobes and strong side lobes is obtained, akin to a difference channel diagram of a monopulse antenna.

As far as the above expression for the parasitic phase shift is concerned, the two terms of order 1 in $\Delta t_k$ are predominant. However, only the phase term:

$$2\pi f_{dc}\Delta t_k$$

does not depend on the azimuthal time coordinate t and can be compensated for during the pulse compression processing.

This compensation is especially beneficial in respect of so-called off-aim or SQUINT configurations in which the azimuthal antenna beam is not perpendicular to the velocity vector of the radar carrier (SLAR configuration). This is because the mean Doppler $f_{dc}$ is then considerable and it is necessary to introduce compensation for the phase shift which it gives rise to if it is desired to guarantee good quality of the impulse response after pulse compression.

It is noted that we are not concerned with the phase shift introduced by the mean Doppler in relation to the distance frequency through the term:

$$\exp[-i2\pi F\tau_c(t-t'-T_e/2+\Delta t_k)]$$

appearing in the expression for the signal after pulse compression of relation (5). To compensate for this phase shift, it is possible to modify the expression for the transfer function of the matched filter, adopting the following value for the spectrum of an celementary pulse of rank k:

$$X_{1,k}{}^{(s)}(F) = P(F-\Delta f_{p(k)})e^{-i2\pi(F-\Delta f_{p(k)})T/2}e^{i2\pi \tilde{f}_{dc}\Delta t_k}$$

instead of:

$$X_{1,k}(F) = P(F-\Delta f_{p(k)})e^{-i2\pi(F-\Delta f_{p(k)})T/2}$$

where $\tilde{f}_{dc}$ is a Doppler parameter of order 1 which may, although not necessarily, be equal to the mean Doppler $f_{dc}$ used in SAR radar imaging processing.

With this new phase correction, the following value is adopted for the expression for the transfer function of the matched filter:

$$H_{is}(F) = X_1^{(s)*}(F)$$

with:

$$X_1^{(s)}(F) = \sum_k \text{rect}\left[\frac{F - \Delta f_{p(k)}}{B}\right]P(F - \Delta f_{p(k)})e^{-i2\pi(F-\Delta f_{p(k)})T/2}e^{i2\pi \tilde{f}_{dc}\Delta t_k}$$

After matched filtering and distancewise inverse Fourier transform, the following signal is finally obtained:

$$v_2(\tau, t) = G_{proc}(NB\text{wsinc}(NB\tau)_\tau^* \qquad (6)$$

$$\int\int \Gamma(F, t')\exp[i2\pi F\tau_0]\sum_k \text{rect}\left[\frac{F - \Delta f_{p(k)}}{B}\right]$$

$$\exp[-i2\pi F\tau_c(t-t'-T_e/2+\Delta t_k)]\exp[-i2\pi \tilde{f}_{dc}\Delta t_k]$$

$$h_{az}(t-t'-T_e/2+\Delta t_k)\exp[i2\pi F\tau]dt'dF$$

Figure 3:
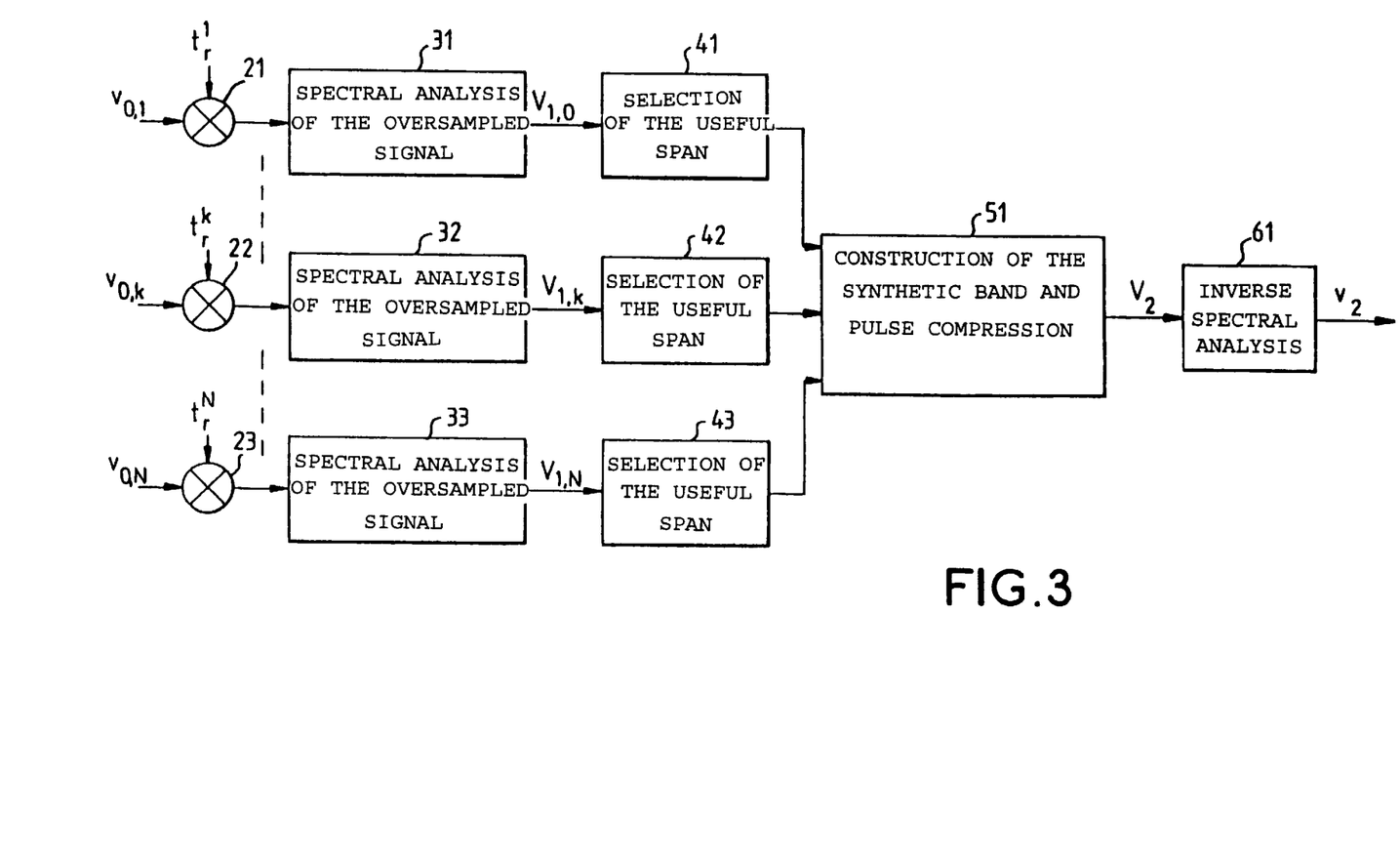

FIG. 3 illustrates the main stages of the pulse compression processing just proposed.

The raw video reception signal $v_0$ is available at the output of the analog/digital converter of the receiver of the radar, in the form of a table of complex samples with three dimensions: a dimension k which depends on the rank of the elementary pulse which is at the origin thereof, in the synthetic-band waveform pattern, and two time dimensions, one $\tau$, short-term, which measures the time which elapses between the transmissions of two elementary pulses of a synthetic-band waveform pattern, which is representative of the echo return time and which provides for the tagging of targets along the distance axis, and the other, t, longer term, which measures the order of succession of the transmissions of the synthetic-band waveform patterns, which allows assessment of the Doppler effect on the echoes of the targets and which provides for the tagging of targets along a Doppler or azimuth axis oriented in the direction of movement of the radar relative to the targets.

The first stage consists in multiplying, with the aid of a bank of complex multipliers 21, 22, . . . , 23, the samples of the raw video reception signal $v_{0,k}(\tau, t)$ of like rank k by a frequency transposition term:

$$tr_k(\tau) = \exp[i2\pi\Delta f_{p(k)}(\tau+\tau_0)]$$

$\Delta f_{p(k)}$ being the gap of the carrier frequency of the kth pulse with respect to the central carrier frequency $f_c$ of the synthetic-band waveform pattern, given that the elementary pulses are not in natural order but permuted so as to improve the effectiveness of the bandpass reception filter, and $\tau_0$ being the lag after transmission of an elementary pulse, whereafter consideration of the receipt signal begins.

The second stage consists in carrying out, at 31, 32, . . . , 33, distancewise spectral analyses, of oversamplings, in a ratio N, of the raw video reception signals of the various ranks k after their frequency translations. It makes it possible to obtain the signals $V_{1,k}$ (F, t).

The third stage consists in selecting, at 41, 42, . . . , 43 a useful span in each of the frequency spectra resulting from the previous spectral analyses, each useful span having a bandwidth B corresponding to that of an elementary pulse of the synthetic-band waveform pattern and the various spans, N in number, being shifted in relation to one another in accordance with the carrier frequencies of the elementary pulses of rank k to which the analysed signals correspond, so as to cover a global band N×B.

The fourth stage 51 consists in reconstructing the synthetic band by juxtaposing the various spans selected in the spectral analyses, and in performing the pulse compression by matched filtering in the distancewise frequency domain to obtain a signal $V_2$(F, t).

The fifth and last stage 61 consists of a distancewise inverse spectral analysis making it possible to go back to the distancewise time domain and to obtain a raw video reception signal $v_2(\tau, t)$ with two time dimensions, distancewise and azimuthal.

Figure 4:
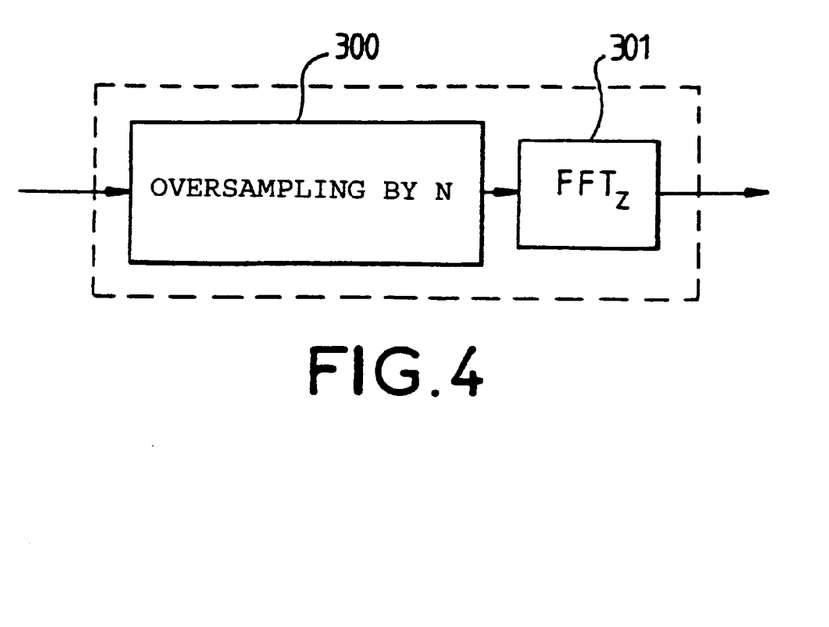
FIGS. 4 and 5 detail two ways of carrying out a spectral analysis of the oversampled signal which can be used in the course of a pulse compression processing according to the invention.

FIG. 4 details a first way of carrying out a distancewise spectral analysis of a signal oversampled in a ratio N, usable in the course of the second stage of the pulse compression process illustrated in the previous figure. This first way consists:

in the course of a first stage 300, in oversampling, by a factor N, the signal before spectral analysis by adding (N−1) null samples between each starting sample, then in the course of a second stage 301, in performing the spectral analysis on the oversampled signal, for example, by a Fourier transformation or by a high-resolution method.

Figure 5:
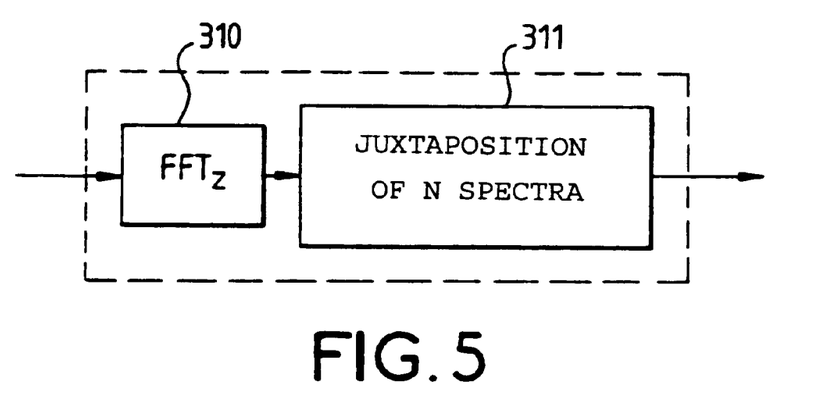

FIG. 5 details a second way of carrying out a distancewise spectral analysis of a signal oversampled in a ratio N, usable in the course of the second stage of the pulse compression process illustrated in FIG. 3. This second way consists:

in the course of a first stage 310, in performing the spectral analysis on the starting signal, for example, by a Fourier transformation or by a high-resolution method, then in the course of a second stage 311, in duplicating N times the frequency spectrum obtained.

This second way of operating has a certain advantage over the first since it makes it possible to reduce the amount of computation required for the analyses of spectra which are carried out on a lesser number of samples.

Figure 6:
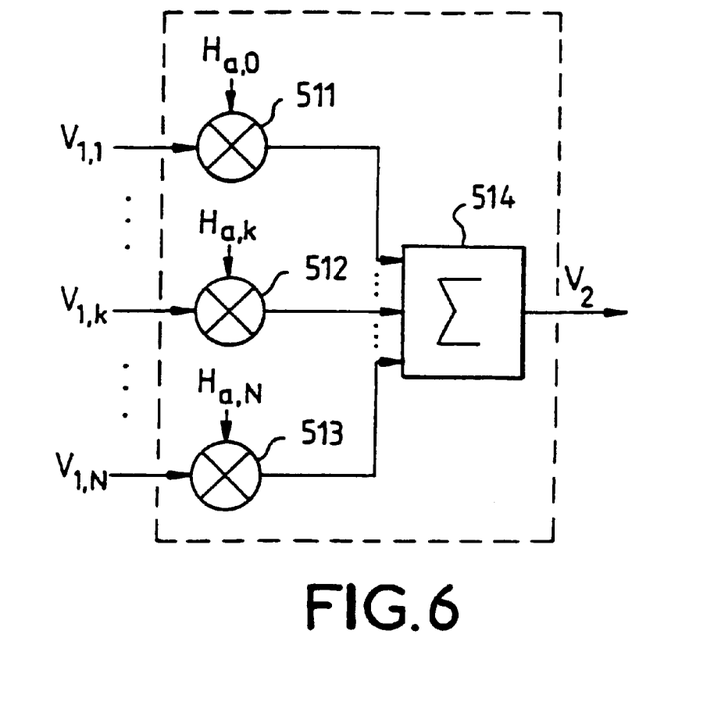
FIGS. 6 and 7 detail two ways of reconstructing the global frequency spectrum of the reception signal in response to the transmission of a synthetic-band waveform pattern and of compressing this global frequency spectrum, which can be used in the course of a pulse compression processing according to the invention; and a FIG. 8 represents a schematic diagram of a Doppler initialization preprocessing advantageously supplementing a pulse compression processing according to the invention in the case of a subsequent implementation of a Doppler processing.

FIG. 6 details a first way of carrying out the reconstruction of the synthetic band and the pulse compression, usable in the course of the fourth stage of the pulse compression process illustrated in FIG. 3. This first way consists:

in the course of a first stage, in carrying out a matched filtering with regard to each spectral component $V_{1,k}$ corresponding to the raw video reception signals in return for an elementary pulse of rank k, by multiplying with the aid of a bank of multipliers 511, 512, . . . , 513, this spectral component $V_{1,k}$ by the conjugate $H_{i,k}$ of the frequency spectrum of the elementary pulse of rank k:

$$H_{i,k} = X_{1,k}^*(F)$$

with:

$$X_{1,k}(F) = P(F - \Delta f_{p(k)}) e^{-i2\pi(F - \Delta f_{p(k)})T/2}$$

where P(F) is the spectrum of an elementary pulse transmitted at the central carrier frequency of the synthetic-band waveform pattern and $\Delta f_{p(k)}$ the gap in the carrier frequency of the kth pulse with respect to the central carrier frequency of the pattern $f_c$, or, as a variant, to compensate for a phase shift introduced by the mean Doppler with regard to the distance frequency, with:

$$X_{1,k}(F) = P(F - \Delta f_{p(k)}) e^{-i2\pi(F - \Delta f_{p(k)})T/2} e^{i2\pi \bar{f}_{dc} \Delta t_k}$$

then, in the course of a second stage, in reconstructing the global spectrum of the synthetic band by juxtaposing, by means of an adder 514, the frequency spectra of the various raw video reception signals which originate from the responses of the targets to the set of elementary pulses of the synthetic-band waveform pattern which was transmitted and which have been pulse-compressed.

Figure 7:
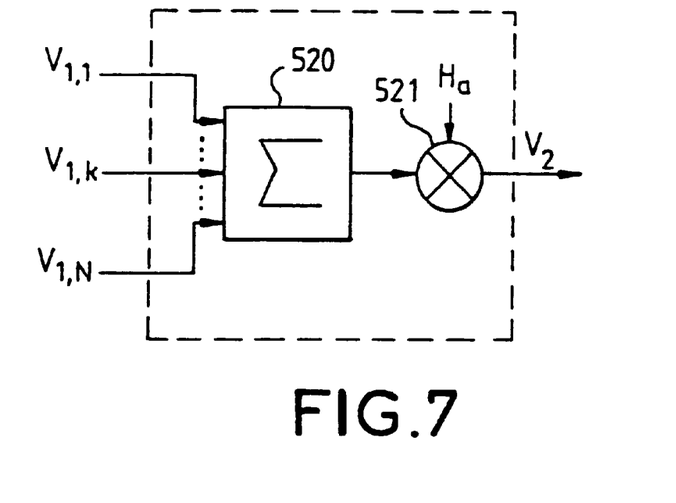

FIG. 7 details a second way of carrying out the reconstruction of the synthetic band and the pulse compression, usable in the course of the fourth stage of the pulse compression process illustrated in FIG. 3. This second way consists:

in the course of a first stage, in reconstructing the global spectrum of the synthetic band by juxtaposing, by means of an adder 520, the frequency spectra of the various raw video reception signals which originate from the responses of the targets to the set of elementary pulses of the pattern of the synthetic-band waveform transmitted, then in the course of a second stage, in carrying out a matched filtering with regard to the global spectral component obtained $V_1$ corresponding to the raw video reception signals in return for the set of elementary pulses of a synthetic-band waveform pattern, by multiplying with the aid of a multiplier 521, this global spectral component $V_1$ by the conjugate $H_i$ of the reconstructed global frequency spectrum of a synthetic-band waveform pattern:

$$H_i(F) = X_1^*(F)$$

with:

$$X_1(F) = \sum_k P(F - \Delta f_{p(k)}) e^{-i2\pi(F - \Delta f_{p(k)})T/2} \mathrm{rect}\left[\frac{F - \Delta f_{p(k)}}{B}\right]$$

where P(F) is the spectrum of an elementary pulse transmitted at the central carrier frequency of the synthetic-band waveform pattern and $\Delta f_{p(k)}$ the gap in the carrier frequency of the kth pulse with respect to the central carrier frequency of the pattern $f_c$ or, as a variant, to compensate for a phase shift introduced by the mean Doppler with regard to the distance frequency, with:

$$X_1(F) = \sum_k \mathrm{rect}\left[\frac{F - \Delta f_{p(k)}}{B}\right] P(F - \Delta f_{p(k)}) e^{-i2\pi(F - \Delta f_{p(k)})T/2} e^{i2\pi \bar{f}_{dc} \Delta t_k}.$$

The two above-described ways of operating for carrying out the reconstruction of the synthetic band and the pulse compression are equivalent by reason of the distributivity of addition, which allows reconstruction of the global synthetic band, with respect to multiplication, which allows matched filtering.

After the pulse compression by synthetic band, the raw video reception signal of a radar can be used for various purposes and in particular for SAR radar imaging processing but it is then necessary to take into account a parasitic phase-shift term introduced by the pulse compression by synthetic band.

This is because, we have seen (relation 6) that the raw video reception signal after synthetic band pulse compression $v_2(\tau, t)$ had the expression:

$$v_2(\tau, t) = G_{proc}(NB\text{wsinc}(NB\tau)^*_\tau$$

$$\int\int \Gamma(F, t')\exp[i2\pi F\tau_0]\sum_k \text{rect}\left[\frac{F - \Delta f_{p(k)}}{B}\right]$$

$$\exp[-i2\pi F\tau_c(t - t' - T_e/2 + \Delta t_k)]\exp\left[-i2\pi \tilde{f}_{dc}\Delta t_k\right]$$

$$h_{az}(t - t' - T_e/2 + \Delta t_k)\exp[i2\pi F\tau]dt'dF$$

The first stage of the Doppler part proper of SAR processing consists in taking the Fourier transform of the compressed signal along the distance axis. This actually makes it possible to convert the delay due to the propagation time for each target into a phase shift related to the Doppler parameters.

In the particular case of the synthetic-band waveform, this distancewise Fourier transform also gives access explicitly to the distancewise spectral sub-bands for which the azimuthal impulse response is different. We thus have:

$$V_2(F, t) = R_d(F) \times \int \sum_k h_{az}(t - t' - T_e/2 + \Delta t_k)\exp\left[-i2\pi\tilde{f}_{dc}\Delta t_k\right]$$

$$\int \text{rect}\left[\frac{F' - \Delta f_{p(k)}}{B}\right]\Gamma(F', t')\exp[i2\pi F'\tau_0]$$

$$\exp[-i2\pi F'\tau_c(t - t' - T_e/2 + \Delta t_k)]$$

$$\int e^{i2\pi(F' - F)\tau}d\tau dt'dF'$$

or again:

$$V_2(F, t) = R_d(F) \times \Gamma(F, t')\exp[i2\pi F\tau_0]$$

$$\int \sum_k h_{az}(t - t' - T_e/2 + \Delta t_k)$$

$$\exp\left[-i2\pi\tilde{f}_{dc}\Delta t_k\right]\text{rect}\left[\frac{F - \Delta f_{p(k)}}{B}\right]$$

$$\exp[-i2\pi F\tau_c(t - t' - T_e/2 + \Delta t_k)]dt'$$

The second stage of the Doppler part of SAR radar imaging processing consists in taking the azimuthal Fourier transform of the above signal so as to bring out, on the one hand, the Fourier transform of the desired backscattering coefficient and, on the other hand, the transfer function of the azimuthal radar imaging system. On this occasion, the dependence of this transfer function with regard to the relevant distancewise spectral sub-band will be clearly revealed in the form of an easily compensatable phase term. It then follows that:

$$V_2(F, f) = R_d(F)\int\int \Gamma(F, t')\exp[i2\pi F\tau_0] \quad (7)$$

$$\sum_k h_{az}(t - t' - T_e/2 + \Delta t_k)$$

$$\exp\left[-i2\pi\tilde{f}_{dc}\Delta t_k\right]\text{rect}\left[\frac{F - \Delta f_{p(k)}}{B}\right]$$

$$\exp[-i2\pi F\tau_c(t - t' - T_e/2 + \Delta t_k)]$$

$$\exp[-i2\pi ft]dt'dt$$

or:

$$V_2(F, f) = R_d(F)\int \Gamma(F, t')\exp[i2\pi F\tau_0]\exp[-i2\pi ft']$$

$$\exp[-i2\pi fT_e/2]\sum_k \text{rect}\left[\frac{F - \Delta f_{p(k)}}{B}\right]$$

$$\exp\left[-i2\pi\tilde{f}_{dc}\Delta t_k\right]\exp[i2\pi f\Delta t_k]dt'$$

$$\int h_{az}(y)\exp[-i2\pi F\tau_c(y)]\exp[-i2\pi fy]dy$$

or again:

$$V_2(F, f) = R_d(F)\exp[i2\pi F(\tau_0 - \tau_{c0})]\Gamma(F, f)H_{az}(F, f)$$

$$\sum_k \text{rect}\left[\frac{F - \Delta f_{p(k)}}{B}\right]\exp\left[-i2\pi\tilde{f}_{dc}\Delta t_k\right]\exp[i2\pi f\Delta t_k]$$

where $H_{az}$ denotes the azimuthal transfer function of the radar imaging system such that:

$$H_{az}(F, f) = \exp[-i2\pi fT_e/2]$$

$$\int \text{rect}\left[\frac{t}{T_e}\right]g_{az}(t)\exp[-i2\pi(F + f_c)\tau_c(t)]$$

$$\exp[-i2\pi ft]dt$$

By using the modelling of the target outward/return time $\tau_c$ with the aid of the Doppler parameters, this transfer function can also be written:

$$H_{az}(F, f) = \exp[-i2\pi fT_e/2]\int \text{rect}\left[\frac{t}{T_e}\right]g_{az}(t)$$

$$\exp\left[i2\pi\left(1 + \frac{F}{f_c}\right)\left(f_{dc}t + \frac{1}{2}f_{dr}t^2 + \frac{1}{6}t^3 \cdots\right)\right]$$

$$\exp[-i2\pi ft]dt$$

Going back to relation (7), the presence of a parasitic phase term is observed:

$$\exp[i2\pi(f - f_{dc})\Delta t_k]$$

which is due to the pulse compression of a synthetic-band waveform and which depends on the spectral sub-band associated with the elementary pulse of rank k.

To compensate for this parasitic phase term, it is proposed to add a corrector phase term:

$$\sum_k \text{rect}\left[\frac{F - \Delta f_{p(k)}}{B}\right]\exp\left[-i2\pi(f - \tilde{f}_{dc})\Delta t_k\right]$$

to the expression for the azimuthally matched filter adopted for a conventional waveform.

It is recalled that the expression for the azimuthally matched filter for an SAR radar imaging processing is given, to a first approximation, by:

$$H_a(F,f) = H_{az}*(F,f)$$

an effective weighting window often being introduced so as to limit the level of the side lobes of the azimuthal impulse response, having the expression:

$$W_{eff}(f) = G_{proc} \text{rect}\left[\frac{f}{B_d}\right] \frac{W(f)}{|H_{az}(F,f)|^2}$$

where W(F) is the useful weighting window and $G_{proc}$ an optional factor for compensating for the gain afforded by the processing such that:

$$G_{proc} = \frac{F_r}{B_d \text{wsinc}(0)}$$

$F_r$ being the frequency of repetition of the synthetic-band waveform pattern.

Thus, with the conventional waveform, a relation of the form:

$$H_a(F,f) = G_{proc} \text{rect}\left[\frac{f}{B_d}\right] \frac{W(f)}{|H_{az}(F,f)|^2} H^*_{az}(F,f)$$

is generally adopted for the expression for the matched filter.

With the synthetic-band waveform, a matched filter expression of the form:

$$H_a(F,f) = G_{proc} \text{rect}\left[\frac{f}{B_d}\right] \frac{W(f)}{|H_{az}(F,f)|^2} H^*_{az}(F,f)$$

$$\sum_k \text{rect}\left[\frac{F - \Delta f_{p(k)}}{B}\right] e^{-i2\pi(f-\bar{f}_{dc})\Delta t_k}$$

will be adopted so as to take account of the parasitic phase term introduced by the synthetic-band pulse compression.

After matched filtering and return to the distancewise and azimuthal time domains by azimuthal inverse Fourier transform followed by distancewise inverse Fourier transform, the following signal is obtained:

$$v_3(\tau,t) = \text{wsinc}(B\tau)\text{wsinc}(B_d t)*_{\tau,t}\gamma(\tau+\tau_0-\tau_{c0},t)$$

the product of a convolution of the impulse response after processing, consisting of the product of two independent weighted sincs, times the complex backscattering signal from the targets, translated distancewise so as to take account of the storage of the digital samples of the raw video reception signal in an analysis window commencing at the instant $\tau_0$.

Figure 8:
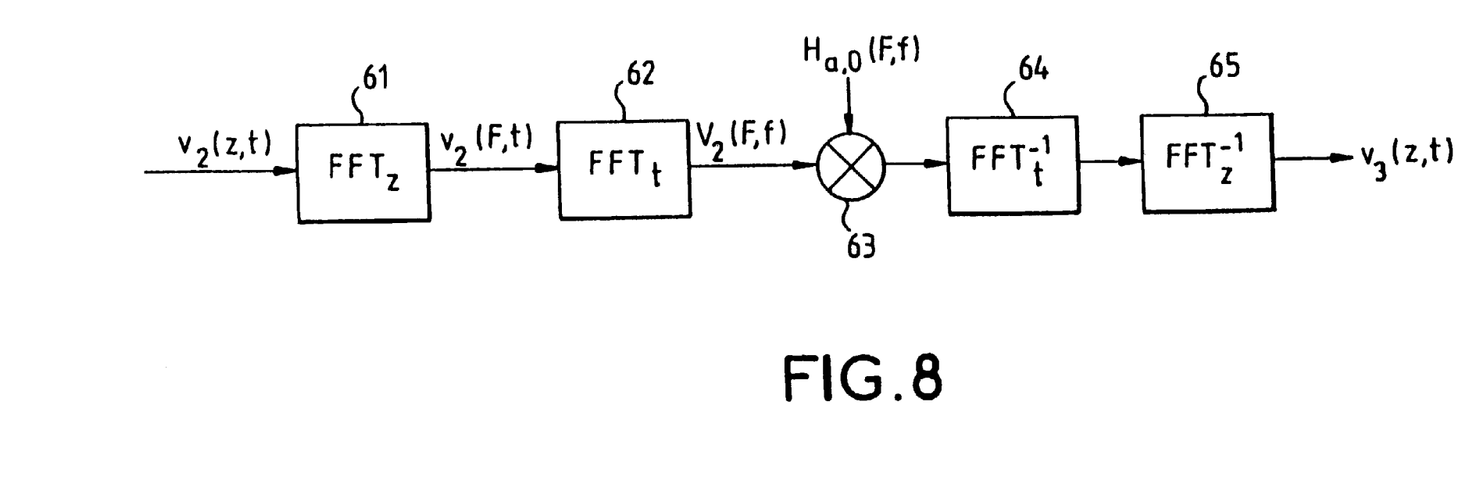

FIG. 8 illustrates the stages of an SAR radar imaging processing after pulse compression by synthetic band.

The first stage 61 consists in performing a Fourier transform along the distance axis on the table $v_2(\tau, t)$ of the samples of the signal received, which arises from the pulse compression processing by synthetic band, illustrated in FIG. 3. This operation makes it possible to retrieve a table of samples $V_2(F, t)$ with distancewise frequency variable F. Although it seems to be a repetition of the distancewise spectral analysis carried out on the occasion of the pulse compression processing, it has its use since it allows a prior segmenting into restricted spans of the distance axis so as to take account of the non-stationarity of the Doppler effect along this axis. This segmentation leads to repeating the operations on the various segments of the table of samples with simpler distancewise Fourier transforms since they pertain to a lesser number of points. The outcome in terms of the amount of computation is often favourable.

The second stage consists in performing an azimuthal Fourier transform 62 so as to retrieve a table of samples $V_2(F,f)$ with both distancewise and azimuthal frequency variables.

The third stage consists in carrying out the matched filtering by multiplying, in a complex multiplier 63, the samples of the table $V_2(F,f)$ by the transfer function:

$$H_{as}(F,f) = G_{proc} \text{rect}\left[\frac{f}{B_d}\right] \frac{W(f)}{|H_{az}(F,f)|^2} H^*_{az}(F,f)$$

$$\sum_k \text{rect}\left[\frac{F - \Delta f_{p(k)}}{B}\right] e^{-i2\pi(f-\bar{f}_{dc})\Delta t_k}$$

taking into account a phase compensation pertaining to the prior pulse compression processing by synthetic band, with a different value depending on the relevant distance spectral regions.

The fourth stage consists in performing an azimuthal inverse Fourier transform 64 so as to go back to the azimuthal time domain.

The fifth and last stage consists in performing. a distancewise inverse Fourier transform 65 so as likewise to go back to the distancewise time domain and obtain a table $v_3(\tau, t)$ of the samples of the backscattering signals of the targets making it possible to plot an image in two dimensions along the distance and azimuth axes.

We claim:

1. Very high distance resolution pulse compression process for radar or sonar characterized in that it consists:

in using on transmission a synthetic-band repetitive waveform pattern consisting of a string of N linearly frequency-modulated coherent elementary pulses following one another at a recurrence frequency $F_r$, of rectangular frequency spectra of elementary band B and of stepped carrier frequencies such that their frequency spectra will link up exactly one ahead of another to form a global frequency spectrum of width N×B, the said N elementary pulses following one another in any order corresponding via a permutation p(k) to the natural order based on increasing carrier frequencies;

in demodulating at reception the signal received in return for each elementary pulse by the carrier frequency of the relevant elementary pulse so as to extract the complex envelope therefrom;

in filtering the signals received and demodulated by a filter which passes the frequency band B of an elementary pulse;

in sampling the signals received, demodulated and filtered at a sampling frequency of the order of the band B of the elementary pulses, according to two time scales: one short-term scale, with variable τ measuring the time which elapses between two successive pulses of a pattern of the transmission waveform and catering for a tagging of targets along a distance axis, the other a longer-term scale with variable t, measuring the succession of patterns of the transmission waveform and catering for a tagging of targets along a Doppler or azimuth axis parallel to the direction of movement of the radar or of the sonar with respect to the targets;

in translating the frequency spectrum of the signal received in return for a Kth pulse so as to set it back in its place within the frequency spectrum of the global pattern of the transmitted waveform by multiplying the samples of the return signal for a kth elementary pulse by a complex exponential dependent on the time variable T along the distance axis:

$$t_r^k(\tau) = \exp\{i 2\pi \Delta f_{p(k)}(\tau + \tau_0)\}$$

$\tau_0$ being the lag after which storage of the digital samples on the distance axis begins, $\Delta f_{p(k)}$ being the carrier frequency gap of the kth elementary pulse with respect to the central carrier frequency $f_c$ of the pattern;

in performing a distancewise spectral analysis of an oversampling, in a ratio N, of the frequency-translated complex samples so as to go, distancewise, from the time domain with variable $\tau$ to a frequency domain with variable F and obtain a sampled frequency spectrum for the return signal of each elementary pulse;

in selecting from the distancewise frequency spectrum obtained for the signal received in return for a kth elementary pulse, the samples belonging to a span centred around $\Delta f_{p(k)}$ with a width equal to that of the band B of an elementary pulse;

in constructing, from the samples of the selected spans of the distancewise frequency spectra of the signals in return for the elementary pulses, a sampling of the product of the global distancewise frequency spectrum of the signal received in return for the set of elementary pulses of a synthetic-band waveform pattern, times the conjugate of the global frequency spectrum of the elementary pulses of a synthetic-band waveform pattern so as to carry out filtering matched globally to the synthetic-band waveform, and in performing a distancewise inverse spectral analysis so as to return to the distancewise time domain and obtain a distance-compressed received signal.

2. Process according to claim 1, characterized in that the distancewise spectral analysis of an oversampling, in a ratio N, of the frequency-translated samples of the signal received in return for an elementary pulse of order k consists:

in oversampling, in a ratio N, the frequency-translated complex samples of the raw video signal received in return for an elementary pulse of rank k, by inserting N−1 null samples between each of them, and in performing a distancewise discrete Fourier transform on the oversamples obtained so as to go, distancewise, from the time domain with variable $\tau$ to a frequency domain with variable F.

3. Process according to claim 1, characterized in that the distancewise spectral analysis of an oversampling, in a ratio N, of the frequency-translated samples of the signal received in return for an elementary pulse of order k consists:

in performing a distancewise discrete Fourier transform on the frequency-translated complex samples so as to go distancewise from the time domain with variable $\tau$ to a frequency domain with variable F, and in duplicating N times the sampled frequency spectrum obtained.

4. Process according to claim 1, characterized in that the construction of the sampling of the product of the global frequency spectrum of the signal received times the conjugate of the global frequency spectrum of a synthetic-band waveform pattern consists:

in multiplying the samples of the selected span of the distancewise frequency spectrum of the signal received in return for a kth elementary pulse by the conjugate $X_{1,k}^*(F)$ of the frequency spectrum of this kth transmitted elementary pulse, so as to carry out a matched filtering, $X_{1,k}(f)$ complying with the relation:

$$X_{1,k}(F) = P(F - \Delta f_{p(k)}) e^{-i 2\pi (F - \Delta f_{p(k)}) T/2}$$

where P(F) is the spectrum of an elementary pulse transmitted at the central carrier frequency of the synthetic-band waveform pattern, and in juxtaposing the frequency spectrum spans obtained for the signals received in return for the elementary pulses after matched filterings, so as to produce a global frequency spectrum which would correspond to that of a signal obtained in response to a linearly frequency-modulated single pulse of band N×B, after matched filtering.

5. Process according to claim 1, characterized in that the construction of the sampling of the product of the global frequency spectrum of the signal received times the conjugate of the global frequency spectrum of a synthetic-band waveform pattern consists:

in multiplying the samples of the selected span of the distancewise frequency spectrum of the signal received in return for a kth elementary pulse by the conjugate $X_{1,k}^{(s)*}(f)$ of the frequency spectrum of this kth transmitted elementary pulse, so as to carry out a matched filtering, $X_{1,k}^{(s)}(f)$ complying with the relation:

$$X_{1,k}^{(s)}(F) = P(F - \Delta f_{p(k)}) e^{-i 2\pi (F - \Delta f_{p(k)}) T/2} e^{i 2\pi f_{dc} \Delta t_k}$$

where P(F) is the spectrum of an elementary pulse transmitted at the central carrier frequency of the synthetic-band waveform pattern and $f_{dc}$ a mean Doppler parmeter conveying the influence of the azimuthal time variable t on the radar/target outward/return propagation time, and in juxtaposing the frequency spectrum spans obtained for the signals received in return for the elementary pulses after matched filterings, so as to produce a global frequency spectrum which would correspond to that of a signal obtained in response to a linearly frequency-modulated single pulse of band N×B, after matched filtering.

6. Process according to claim 1, characterized in that the construction of the sampling of the product of the global frequency spectrum of the signal received times the conjugate of the global frequency spectrum of a synthetic-band waveform pattern consists:

in juxtaposing the samples of the selected spans of the frequency spectra of the signals received in return for the elementary pulses, and in multiplying the samples of the global frequency spectrum obtained by the conjugate $X_1^*(F)$ of the global frequency spectrum resulting from the juxtaposition of the frequency spectra of the elementary pulses transmitted, $X_1(F)$ complying with the relation:

$$X_1(F) = \sum_k P(F - \Delta f_{p(k)}) e^{-i 2\pi (F - \Delta f_{p(k)}) T/2} \mathrm{rect}\left[\frac{F - \Delta f_{p(k)}}{B}\right]$$

where P(F) is the spectrum of an elementary pulse transmitted at the central carrier frequency of the synthetic-band waveform pattern.

7. Process according to claim 1, characterized in that the construction of the sampling of the product of the global frequency spectrum of the signal received times the conjugate of the global frequency spectrum of a synthetic-band waveform pattern consists:

in juxtaposing the samples of the selected spans of the frequency spectra of the signals received in return for the elementary pulses, and in multiplying the samples of the global frequency spectrum obtained by the conjugate $X_1^{(s)*}(F)$ of the global frequency spectrum resulting from the juxtaposition of the frequency spectra of the elementary pulses transmitted, $X_1^{(s)}(F)$ complying with the relation:

$$X_1^{(s)}(F) = \sum_k \text{rect}\left[\frac{F - \Delta f_{p(k)}}{B}\right] P(F - \Delta f_{p(k)}) e^{-i2\pi(F - \Delta f_{p(k)})T/2}$$

$$e^{i2\pi \bar{f}_{dc} \Delta t_k}$$

where P(F) is the spectrum of an elementary pulse transmitted at the central carrier frequency of the synthetic-band waveform pattern and $f_{dc}$ a mean Doppler parmeter conveying the influence of the azimuthal time variable t on the radar/target outward/return propagation time.

8. Process according to claim 1, characterized in that it furthermore consists in carrying out a complementary initialization processing in respect of Doppler processing on the samples of the distance-compressed signal received, arrayed as a two-dimensional table $v_2(\tau, t)$ as a function of the two time variables $\tau$ along the distance axis and t along the azimuth axis, the said complementary processing consisting, after having performed in succession a distance-wise Fourier transform and then an azimuthal Fourier transform on the signal so as to go into the distancewise frequency domain with a frequency variable F and azimuthal frequency domain with a frequency variable f and obtain a table of samples $V_2(F,f)$, in multiplying the sequences of samples belonging to the various distance spectral regions of the elementary pulses splitting into N sub-bands of width B, the band N×B of the frequency variable F, by a phase corrective term such that:

$$\exp\{-i2\pi(f - f_{dc})\Delta t_k\}$$

where $\Delta t_k$ is the lag separating the kth relevant pulse from the middle of the pattern of the transmission waveform of which it forms part and $f_{dc}$ a mean Doppler parameter conveying the influence of the time variable t on the radar/target outward/return propagation time.

* * * * *